United States Patent [19]
DiVita et al.

[11] Patent Number: 5,367,372
[45] Date of Patent: Nov. 22, 1994

[54] METHOD OF AND APPARATUS FOR MEASURING THE GEOMETRIC CHARACTERISTICS OF NOMINALLY CYLINDRICAL GUIDING STRUCTURES

[75] Inventors: Pietro DiVita, Cascina Vica; Pierangelo Morra, Moncalieri, both of Italy

[73] Assignee: Sip - Societa Italiana Per L'Esercizio Delle Telecomunicazioni, Turin, Italy

[21] Appl. No.: 971,515

[22] Filed: Nov. 3, 1992

[30] Foreign Application Priority Data

Nov. 15, 1991 [IT]  Italy .......................... TO91A000884

[51] Int. Cl.⁵ ...................... G01N 21/88; G01B 11/27
[52] U.S. Cl. ................................ 356/73.1; 356/154; 356/426
[58] Field of Search ................ 356/73.1, 361, 154, 356/426

[56] References Cited

U.S. PATENT DOCUMENTS 4,441,026  4/1984  Moriwaki et al. ............. 356/376 X
4,563,087  1/1986  Bourbin et al. .................... 356/73.1

FOREIGN PATENT DOCUMENTS 0367331  10/1989  European Pat. Off. .
3824255   1/1990  Germany .
3822425   2/1990  Germany .
54-34259  3/1979  Japan ................................. 356/73.1
61-237032 10/1986 Japan ................................. 356/73.1

*Primary Examiner*—Vincent P. McGraw
*Attorney, Agent, or Firm*—Herbert Dubno

[57] ABSTRACT

The method and the device are intended to measure the geometrical characteristics of components of optical communication systems comprising a body (1) with nominally cylindrical external surface and an internal element (2) nominally coaxial with body (1). The component is placed in a V-groove (3) and rotated by 360°. A TV-camera (8) detects the curve (4) described by a point of the internal element during the rotation. Numerical analysis of the curve provides, by a single operation, eccentricity of the internal element and non-circularity of the external surface of the body. (FIG. 5 )

10 Claims, 2 Drawing Sheets

METHOD OF AND APPARATUS FOR MEASURING THE GEOMETRIC CHARACTERISTICS OF NOMINALLY CYLINDRICAL GUIDING STRUCTURES

FIELD OF THE INVENTION

The present invention relates to characterization of components for optical communication systems and provides a method of and an apparatus for measuring the geometrical characteristics of nominally cylindrical guiding structures to be used in such systems.

Preferably, but not exclusively, the invention is intended for measuring the degree of non-circularity of the external surface of a ferrule for an optical fiber connector and the eccentricity of its central hole (concentricity error between the central hole and the external surface). As known, the ferrules are cylindrical elements of both parts of a connector, having a hole coaxial with the external surface, into which hole the end portions of the two fiber segments to be joined are inserted. This arrangement ensures the proper core alignment, necessary to avoid losses.

BACKGROUND OF THE INVENTION

As is known, ferrules are cylindrical elements of both parts of many components for optical telecommunication systems, such as optical fibers, connector ferrules, etc. must have geometric characteristics whose values are to lie within certain tolerance intervals with respect to a nominal value. Among those characteristics, the external size, the non-circularity and the eccentricity of a central part with respect to the external surface may be cited for the components mentioned above, which form nominally cylindrical guiding structures.

When testing the structure, a check of such tolerances is necessary.

Of course, a direct measurement of the parameters of interest could be carried out by resorting to mechanical instruments or to microscopy techniques with the help of suitable scales. However mechanical instruments can be used only to determine the external dimensions and the parameters depending thereon, such as non-circularity. Moreover instruments able to precisely evaluate the dimensions involved (of the order of some hundred micrometers at most, in the case of fibers) are extremely expensive. Measurements with microscopy techniques also allow evaluation of internal parameters; however such techniques are not always sufficiently precise.

For these reasons the measurement of the geometrical parameters of a guiding structure comprising an external cylindrical part and an internal part coaxial with the external one is generally carried out by analyzing an image of the structure itself, obtained by suitable methods, such as those defined in CCITT Recommendations G.650, G.651 for the measurement of mode field (spot size) and cladding diameters, of mode field concentricity error and of cladding non-circularity in single-mode and multimode optical fibers. Owing to the analogy of the structure, some of these methods could also be used for characterizing connector ferrules, either in the presence or in the absence of a fiber fitted in the hole.

The methods based on the analysis of an image of the structure have the disadvantage that a precise evaluation of all parameters can be obtained from a single image only if the absolute values of the parameters are not considerably different. "Not considerably different" denotes here a difference of about one order of magnitude at most, as it is the case for instance of the mode field and the cladding diameters in a single-mode optical fiber (about 10 $\mu$m versus about 125 $\mu$m).

If on the contrary the values differ by some orders of magnitude, images with different magnifications are used to measure the different parameters with the same relative precision. The different images are generally obtained with two distinct operations and by different techniques. In this way, however, there is the risk of losing the correlation between the different parameters. This is just the situation occurring in a case of great interest for the invention. In fact, the parameters to be measured for characterizing the ferrule include the non-circularity of the external surface and the eccentricity of the axial hole, measurement of the latter parameter demanding measurement of the eccentricity of the mode field of a single-mode fiber inserted in such a hole. The mode field has, as mentioned, a size of the order of 10 $\mu$m, while the external diameter of the ferrule is of the order of some millimeters. If different images are used for the mode field and the ferrule diameters the distance between the ferrule and mode field centers is difficult to precisely evaluate.

OBJECT OF THE INVENTION

It is the object of the invention to provide an improved method and apparatus for characterizing nominally cylindrical structures which allow evaluation of the different parameters of the structure with a single operation.

SUMMARY OF THE INVENTION

The method provided by the invention comprises the following steps:
- inserting the structure into a V-groove;
- rotating by 360° the structure in the groove;
- detecting the curve described by a point of a central element of the structure on a plane perpendicular to the longitudinal groove direction;
- storing the coordinates of the points of the curve with respect to a system of coordinate axes;
- numerically analyzing the curve to obtain from such coordinates the parameters of interest, more particularly the central element eccentricity with respect to the external surface of the structure and the non-circularity of such a surface.

To obtain the eccentricity, the numerical analysis of the curve comprises the steps of:
- calculating, for each point of the curve, the sum of the coordinates of the point;
- determining the maximum and minimum of such a sum;
- calculating the difference between the maximum and the minimum, the eccentricity being obtained from the ratio between such a difference and a constant factor, depending on the axis orientation.

To obtain the non-circularity, the numerical analysis of the curve comprises the steps of:
- determining the curve barycenter; and
- calculating the mean value of the square of the distances of the curve points from the barycenter, the non-circularity being obtained from such a mean value, from the eccentricity and from the semimajor axis of the structure according to relation:

$$\delta = 2\sqrt{\frac{\langle\rho\rangle^2 - d^2}{R^2}}$$

where $\delta$ is the non-circularity, defined as a difference between the maximum and the minimum diameter of the structure divided by the maximum diameter or by the nominal diameter, $\langle\rho^2\rangle$ is said mean value, d is the eccentricity and R is half the maximum or the nominal diameter of the structure.

SPECIFIC DESCRIPTION

Figure 1:
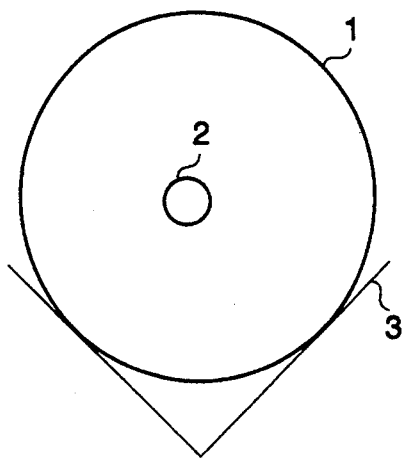
FIG. 1 is a cross-sectional view of a structure to be characterized.

FIG. 1 is a cross-sectional view of a guiding structure consisting of a body 1 with a nominally cylindrical external surface and including a central element 2 nominally coaxial with the outer surface. In the preferred application of the invention, which will be described hereinafter, the structure is a ferrule of an optical fiber connector and the central element 2 is the ferrule hole. As an alternative, element 2 can be the mode field of a single-mode optical fiber inserted into the hole. Yet the method can be applied to any nominally cylindrical structure comprising two coaxial parts with considerably different diameters, e.g. a single-mode optical fiber.

To determine the eccentricity of the central hole and the non-circularity of the external surface, body 1 is placed in a V-groove 3 with 90° aperture (flank angle) and is rotated by 360°; during such a rotation, central element 2 (and more particularly its center) describes (separates) a curve whose shape depends on the ratio between the values of the two parameters above. The curve analysis allows such values to be obtained by exploiting certain geometrical considerations disclosed hereinafter. To make understanding of the invention easier, the eccentricity of the hole (of which only center P is shown) and the non-circularity of the external surface have been extremely exaggerated in FIGS. 2 to 4. Besides, FIGS. 3, 4 show the whole trajectory described by point P in the 360° rotation of body 1. The shape of curve 4 is the one typical of real structures, and not the one obtained with the extremely deformed structure shown in the drawing. The size of the area delimited by the curve is also exaggerated.

For sake of simplicity of the description, it is supposed that the structure cross-section is an ellipse of which the semimajor axis has a length R equal to the nominal structure radius. The eccentricity is represented by distance d between point P and the ellipse centre C; the non-circularity to be measured is a relative value, given by relation $\delta = (R-B)/R$, where B is the length of the semiminor axis, which clearly has value $B = R - R\delta$.

In the most general case, in which the maximum and nominal radii of the structure are different and/or a point does not exist like point C halving both the maximum and the minimum structure diameters, the non-circularity can be defined as the ratio of the difference between maximum and minimum diameters to the nominal diameter (in conformity with the definition given by CCITT for the non-circularity of the cladding of an optical fiber) or to the maximum diameter.

Figure 2:
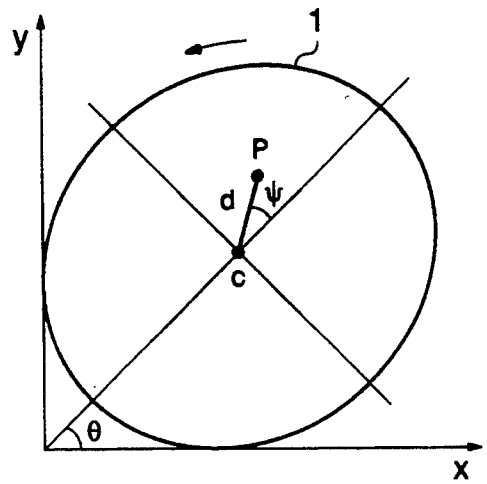
FIGS. 2, 3 are diagrams depicting the method of the invention.
Figure 3:
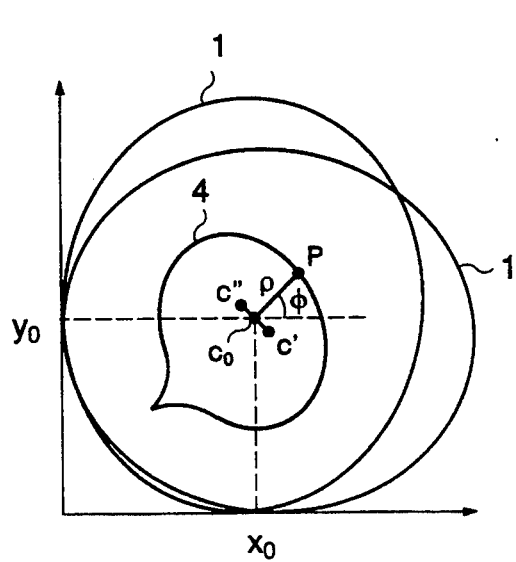
Figure 4:
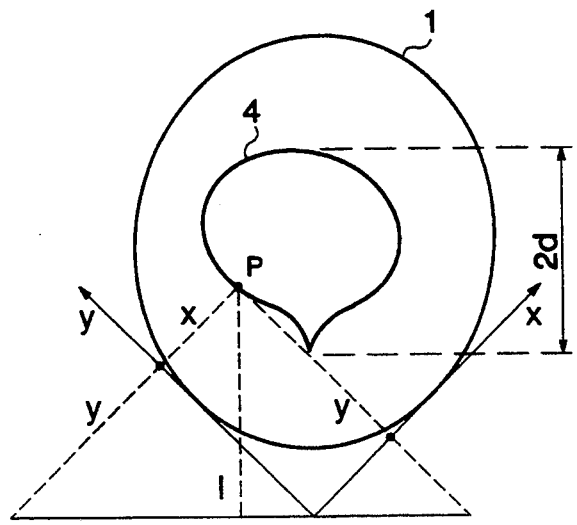
FIG. 4 is a diagram relevant to a variant.

In FIGS. 2, 3:

$\theta$ is the angle formed at a determined instant by the major axis of the ellipse with axis x of a system of orthogonal Cartesian coordinates with origin on the edge of groove 3. Axes x, y of such a system can coincide with the sides of a cross section of groove 3, or, as shown in FIGS. 2, 3, one of them can be horizontal and the other vertical;

$\Psi$ is the angle formed by segment CP with the major axis of the ellipse; xo, yo are the coordinates of the middle point Co of segment C'C'', where C' and C'' are the positions taken by the centre of the ellipse for $\theta = 0$ and $\theta = \pi/2$, respectively; the length of segment C'C'' is $R - R\delta/2$, and point Co represents the barycenter of curve 4 described by point P;

$\rho$ is the distance of point P from the middle point of segment C'C'';

$\Phi$ is the angle formed at a generic instant by segment PCo with axis x.

Taking into account the definitions, the locus of the points described by the extremity P of vector PCo because of the ellipse rotation is given (for $\delta \ll 1$) by relations:

$$x - xo = \frac{R\delta}{2} \cos 2\theta + d \cdot \cos(\theta - \psi) \quad (1)$$

$$y - yo = \frac{R\delta}{2} \cos 2\theta - d \cdot \sin(\theta - \psi)$$

The two relations (1) are obtained by applying the normal rules of study of geometrical loci. It is to be appreciated that the errors due to the fact that relations (1) are approximate relations are lower than those introduced by measurement imprecisions and by the numerical computation.

In addition, there is $$\rho^2(\phi) = \frac{R^2 d^2}{2} \cos^2 2\phi + \quad (2)$$

$$d^2 + \sqrt{2} \cdot R\delta\, d \cdot \cos^2\phi \cdot \cos\left(\phi - \psi - \frac{\pi}{4}\right)$$

This relation can be immediately derived from relations (1), taking into account that $$\rho^2 = (x - xo)^2 + (y - yo)^2.$$

To obtain d, relations (1) are exploited. By summing up said relations, the following relation can be obtained linking the coordinates of point P to the only eccentricity d:

$$(x+y) - (xo+yo) = d[\cos(\theta - \Psi) - \sin(\theta - \Psi)] \quad (3)$$

Function $(x+y)$ has a maximum and minimum which are respectively given by $(x+y)\text{MAX} = d\sqrt{2}$ and $(x+y)\text{min} = -d\sqrt{2}$; hence $$d = \frac{1}{2\sqrt{2}} [(x+y)\text{MAX} - (x+y)\text{min}] \quad (4)$$

It is therefore clear that the knowledge of the points of the curve allows the obtention of the eccentricity value by simple computations.

For determining $\delta$, it is necessary to take into account the mean value of $\rho^2$, which is given by:

$$<\rho>^2 = \frac{1}{2\pi} \int_0^{2\pi} \rho^2(\phi) d\phi = \frac{R^2 \delta^2}{4} + d^2 \quad (5)$$

from which $$\delta = 2\sqrt{\frac{<\rho>^2 - d^2}{R^2}} \quad (6)$$

is obtained.

In FIG. 4 the axes of the system of coordinates coincides with the sides of the angle obtained by a cross section of groove 3. The distance $\perp$ of a point of curve 4 from a horizontal axis passing through the origin of the axes is $|=(x+y)/\sqrt{2}$; this distance can have a maximum value IM and minimum value Im, whose difference clearly gives value 2d. Taking into account the value of $\perp$, $$d = (lM - lm)/2 = [(x+y)\text{Max} - (x+y)\text{min}]/2\sqrt{2} \quad (7)$$

It is to be noted that the axis change does not affect the measurement of the non-circularity of the structure.

Figure 5:
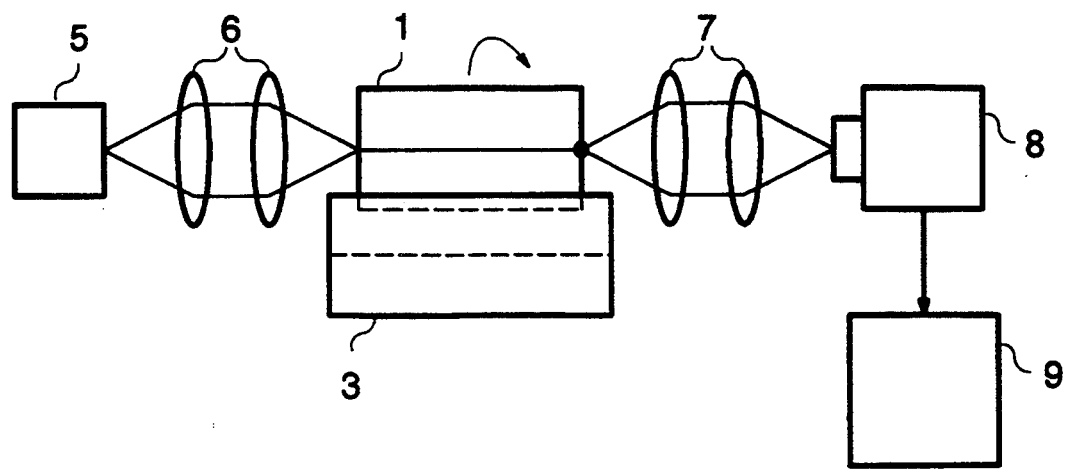
FIG. 5 is a schematic representation of an apparatus for implementing the method.

FIG. 5 schematically shows an apparatus for performing the method. A source 5 emits a light beam which, through an optical system schematically represented by lenses 6, is first collimated and then focused at the inlet of the central element of structure 1 mounted on a V-grooved support 3. The beam emerging from the structure is collected by an optical system schematically represented by lenses 7 and is focused onto a TV camera 8 or another detector capable of detecting the curve described by central element 2. The TV camera is controlled by a processor 9 which performs the numerical analysis of the curve and the computations necessary to obtain the values of the desired characteristics.

Figure 6:
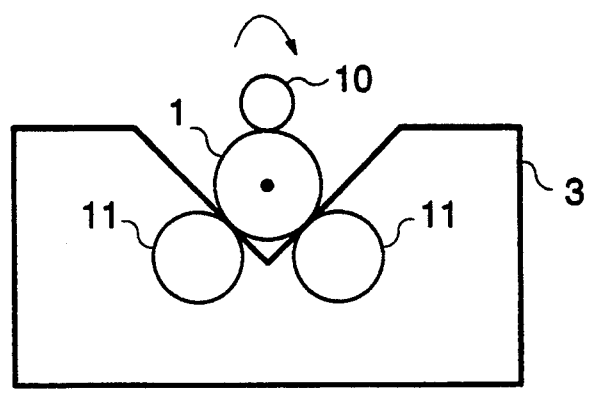
FIG. 6 is a partial schematic representation of the means controlling the structure rotation.

The rotation of structure 1 can be manually obtained, if the external dimensions allow so. Preferably however the rotation is controlled by processor 9 so as to ensure the synchronism with the curve scanning and to avoid irregular displacements of the structure, which are always possible if the rotation is manually controlled. To simplify the drawing, the means controlling rotation has not been represented in FIG. 5. Such means can e.g. comprise a precision mandrel, capable of following the vertical displacements of the structure in the groove due to non-circularity, or a roller 10 (FIG. 6) which is made to rotate on the structure so as to exert a constant pressure and which presents a high friction with the material of the structure itself, so as to make it rotate. In this case the friction between the structure and the groove walls must be very low. This can be obtained by disposing in the support rollers tangent to the structure according to a plane coincident with the walls of the groove itself, or by a suitable choice of the material by which the groove is made or the walls of same are covered.

We claim:

1. A method of measuring geometrical characteristics of a guiding structure comprising a body with a nominally cylindrical external surface and a central element nominally coaxial with the body, said method comprising the steps of:

placing the structure in to a V-section groove;

rotating the structure through by 360° in the groove and generating a curve described by a point of a central element of said structure on a plane perpendicular to a longitudinal direction of the groove;

detecting the curve described by said point of said central element of the structure on said plane perpendicular to the longitudinal direction of the groove;

storing coordinates of the points of the curve with respect to a system of coordinate axes; and numerically analysing the curve to obtain from such coordinates the desired geometrical characteristics.

2. The method as claimed in claim 1 wherein the geometrical characteristics are eccentricity of the central element with respect to the external surface and non-circularity of said external surface.

3. The method as claimed in claim 1, wherein said nominally cylindrical structure is a ferrule of an optical fiber connector, the central element is an axial hole of the ferrule or a mode field of a single-mode optical fiber fitted into such a hole, and the point describing such a curve is a center of said hole or said field.

4. The method as claimed in claim 1, wherein the V-section groove is a groove defining a 90° dihedral angle, and the axes system is a Cartesian system of orthogonal axes with origin on the edge of the groove.

5. The method as claimed in claim 4 wherein the V-Section groove sides are inclined by 45°.

6. The method as claimed in claim 5 wherein said axes coincide with the sides of a cross section of the groove.

7. A method of measuring geometrical characteristics of a guiding structure comprising a body with a nominally cylindrical external surface and a central element nominally coaxial with the body, said method comprising the steps of:

placing the structure in to a v-section groove;

rotating the structure through by 360° in the groove and generating a curve described by a point of a central element of said structure on a plane perpendicular to a longitudinal direction of the groove;

detecting the curve described by said point of said central element of the structure on said plane perpendicular to the longitudinal direction of the groove;

storing coordinates of the points of the curve with respect to a system of coordinate axes; and numerically analysing the curve to obtain from such coordinates the desired geometrical characteristics, wherein the geometrical characteristics are eccentricity of the central element with respect to the external surface and non-circularity of said external surface, and wherein, to obtain the eccentricity, the numerical analysis of the curve comprises the steps of:

calculating, for each point of the curve, the sum of the coordinates of the point itself;

determining the maximum and the minimum of such a sum; and calculating the difference between the maximum and the minimum, the eccentricity being proportional to such a difference.

8. A method of measuring geometrical characteristics of a guiding structure comprising a body with a nominally cylindrical external surface and a central element nominally coaxial with the body, said method comprising the steps of:

placing the structure in to a V-section groove;

rotating the structure through by 360° in the groove and generating a curve described by a point of a central element of said structure on a plane perpendicular to a longitudinal direction of the groove;

detecting the curve described by said point of said central element of the structure on said plane perpendicular to the longitudinal direction of the groove;

storing coordinates of the points of the curve with respect to a system of coordinate axes; and numerically analysing the curve to obtain from such coordinates the desired geometrical characteristics, wherein the geometrical characteristics are eccentricity of the central element with respect to the external surface and non-circularity of said external surface, and wherein, to obtain the non-circularity, the numerical analysis of the curve comprises the steps of:

determining the barycenter of the curve;

calculating the mean value of the square of the distances of the curve points from the barycenter, the non-circularity being obtained from such a mean value, from the eccentricity and from the semimajor axis in accordance with the relation:

$$\delta = 2\sqrt{\frac{<\rho>^2 - d^2}{R^2}}$$

where $\delta$ is the non-circularity, defined as the ratio of the difference between a maximum and a minimum diameter of the structure to the nominal or the maximum diameter, $<\rho^2>$ is said mean value, d is the eccentricity and R is half the nominal or the maximum diameter.

9. An apparatus for measuring the geometrical characteristics of a nominally-cylindrical guiding structures, to be characterized and comprising a body with a nominally cylindrical external surface and a central element nominally coaxial with the external surface comprising:

a support with a V-section groove to hold a structure to be characterized;

a source to illuminate said central element of the structure;

means for rotating the structure in the groove;

means for collecting a light beam outgoing from said central element and generating a curve, and for detecting the curve described by said element on a plane perpendicular to a direction of elongation of the groove because of the rotation by 360° of the structure; and a measuring and computing system, connected to the means for detecting to memorize the coordinates of the points of the curve with respect to a system of coordinate axes and to obtain from such coordinates the desired characteristics.

10. The apparatus claimed in claim 9 wherein the measuring and computing system drives the means controlling the rotation of the structure.

* * * * *